(12) United States Patent
Watanabe

(10) Patent No.: US 10,071,765 B2
(45) Date of Patent: Sep. 11, 2018

(54) VEHICLE PEDAL ARM

(71) Applicant: F-TECH INC., Kuki, Saitama (JP)

(72) Inventor: Aisuke Watanabe, Tochigi (JP)

(73) Assignee: F-TECH INC., Kuki (JP)

( * ) Notice: Subject to any disclaimer, the term of this patent is extended or adjusted under 35 U.S.C. 154(b) by 271 days.

(21) Appl. No.: 14/812,231

(22) Filed: Jul. 29, 2015

(65) Prior Publication Data

US 2016/0039460 A1    Feb. 11, 2016

(30) Foreign Application Priority Data

Aug. 7, 2014   (JP) ................... 2014-161603

(51) Int. Cl.
    *B62D 21/00*     (2006.01)
    *G05G 1/50*     (2008.04)
    *G05G 1/44*     (2008.04)

(52) U.S. Cl.
    CPC ............. *B62D 21/00* (2013.01); *G05G 1/506* (2013.01); *G05G 1/44* (2013.01)

(58) Field of Classification Search
    CPC ........... B62D 21/00; G05G 1/506; G05G 1/44
    See application file for complete search history.

(56) References Cited

U.S. PATENT DOCUMENTS

| | | | | |
|---|---|---|---|---|
| 5,074,163 A | * | 12/1991 | Baumann | G05G 1/30 192/99 S |
| 8,136,864 B2 | * | 3/2012 | Purcell | B60J 7/1252 296/108 |
| 2005/0097983 A1 | * | 5/2005 | Mannle | B60K 26/021 74/560 |
| 2014/0060239 A1 | * | 3/2014 | Hemmege Venkatappa | G05G 1/327 74/512 |
| 2014/0076095 A1 | * | 3/2014 | Hemmege Venkatappa | G05G 1/44 74/512 |
| 2014/0116192 A1 | * | 5/2014 | Hemmege Venkatappa | G05G 1/44 74/512 |

(Continued)

FOREIGN PATENT DOCUMENTS

| | | |
|---|---|---|
| DE | 4226352 A1 * | 2/1993 |
| DE | 20306538 U1 | 8/2003 |

(Continued)

OTHER PUBLICATIONS

English Abstract of DE 4226352 A1, Zemlin et al., Feb. 1993.*

(Continued)

*Primary Examiner* — Vinh Luong
(74) *Attorney, Agent, or Firm* — Westerman, Hattori, Daniels & Adrian, LLP

(57) ABSTRACT

A vehicle pedal arm has a first rib connecting a first hole, into which a first shaft is inserted, and a peripheral edge on a side of a rear wall continuous of at least one of a left side wall and a right side wall in an arm body continuous upward from a first bent portion that bends in a rear direction side of a vehicle as being a lower side of the vehicle, to extend on a first straight line connecting a depressing portion and the first hole in a side view, and a second rib connecting a second hole, into which a second shaft is inserted, and the peripheral edge on a side of the rear wall continuous of the at least one of the both side walls to extend on a second straight line connecting the depressing portion and the second hole in a side view.

6 Claims, 6 Drawing Sheets

(56) References Cited

U.S. PATENT DOCUMENTS

2014/0298949 A1* 10/2014 Brown .................. G05G 1/40
                                                                         74/513
2015/0033905 A1* 2/2015 Hoffmann .............. G05G 1/506
                                                                         74/560

FOREIGN PATENT DOCUMENTS

| DE | 102013015741 A1 | 7/2014 |
| EP | 1331150 A1 | 7/2003 |
| JP | 5-54054 U | 7/1993 |
| JP | 2559704 Y2 | 1/1998 |
| JP | 2001-184135 A | 7/2001 |

OTHER PUBLICATIONS

Define straight line Google Search, google.com., Jun. 30, 2017.*
EPO Machine Translation of EP1331150 (A1), Endemann et al., Jul. 2003.*
EPO Machine Translation of DE20306538 (U1), Edscha, Jul. 2003.*
Define point—Google Search, google.com., Nov. 1, 2017.*
Point/Definition of Point by Merriam-Webster, merriam-webster.com/dictionary/point.*
Depress dictionary definition / depress defined, Webster's New World College Dictionary, Fifth Edition, Nov. 1, 2017.*
European Search Report (ESR) dated Jun. 22, 2016, issued in counterpart European Patent Application No. 15179961.6. (5 pages).

* cited by examiner

VEHICLE PEDAL ARM

BACKGROUND OF THE INVENTION

The present invention relates to a vehicle pedal arm, and more particularly relates to a vehicle pedal arm mounted on a vehicle such as an automobile.

In recent years, in a pedal device mounted on a vehicle such as an automobile, an arm member is frequently molded by using a resin material for weight saving of the vehicle.

Under such circumstances, Japanese Utility Model Application Laid-open Publication No. H5-54054 relates to an acceleration pedal for a vehicle-speed adjusting device and discloses a configuration, in which a wire end, a rotation supporting portion, and a pedal depressing portion are coupled in a vertical plane, a first side beam and a second side beam are arranged in parallel on both sides of a main beam material having a rectangular cross-section with a long side being a vertical direction, and the side beams are coupled by a diagonal beam and a plurality of ribs, in order to improve strength and stiffness with respect to both bending moment and distortion.

SUMMARY OF THE INVENTION

However, according to studies made by the present inventor, in the configuration of Japanese Utility Model Application Laid-open Publication No. H5-54054, if it is attempted to perform integral molding by using a resin material, there is a certain limitation in increasing only a cross-sectional areas of the first side beam, the second side beam, and the ribs in a direction of a depressing force. Therefore, at the time of application thereof to a pedal arm having a large depressing force applied thereto such as a brake pedal, it may be difficult to ensure required strength and stiffness. Accordingly, there is a room for improvement in view of weight saving, while ensuring the required stiffness and strength.

Furthermore, according to the studies made by the present inventor, such a new configuration has been strongly desired that can maintain and improve the strength and stiffness, while reducing the weight of the pedal arm, even if a shape of the pedal arm is largely curved in order to prevent interference with a peripheral component or the like, while ensuring an appropriate pedal position.

The present invention has been achieved in view of the above studies, and an object of the present invention is to provide a vehicle pedal arm that is suitable for integral molding by using a resin material, and can realize weight saving while maintaining required productivity, strength, and the like with a simple configuration.

To achieve the above object, a first aspect of the present invention is to provide a pedal arm mounted on a vehicle, comprising: an arm body having a front wall, a rear wall, a left side wall, and a right side wall corresponding to a front and rear direction and a right and left direction of the vehicle, with a plurality of ribs arranged in a standing manner to be an integrally molded article; a depressing portion provided at a lower end of the arm body; a first hole penetrating the arm body in the front and rear direction of the vehicle, into which a first shaft fixed to a vehicle body is inserted; and a second hole penetrating the arm body in the front and rear direction of the vehicle, into which a second shaft connected to a vehicle control system is inserted. Here, the arm body has a first bent portion that bends in a rear direction side of the vehicle as being a lower side of the vehicle. The rear wall in the arm body continuous downward from the first bent portion is arranged on a lower side of the vehicle than a first straight line connecting the depressing portion and the first hole and a second straight line connecting the depressing portion and the second hole. Also, the plurality of ribs include, in at least one of the left side wall and the right side wall, a first rib that connects the first hole and a peripheral edge on a side of the rear wall continuous of the at least one of the left side wall and the right side wall in the arm body continuous upward from the first bent portion to extend on the first straight line as viewed in a side view of the vehicle, and a second rib that connects the second hole and a peripheral edge on the side of the rear wall continuous of the at least one of the left side wall and the right side wall in the arm body continuous upward from the first bent portion to extend on the second straight line as viewed in the side view.

According to a second aspect of the present invention, in addition to the first aspect, the plurality of ribs further include a third rib that extends from the first hole so that an angle defined between the first rib and the third rib is within a range of an acute angle more than or equal to 45° and less than 90° or an angle of 90° toward the depressing portion, and a fourth rib that extends from the second hole so that an angle defined between the second rib and the fourth rib is within a range of an acute angle more than or equal to 45° and less than 90° or an angle of 90° toward the depressing portion.

According to a third aspect of the present invention, in addition to the first or second aspect, the arm body further includes a second bent portion that bends to one of a left direction side and a right direction side of the vehicle as being the lower side of the vehicle, and the plurality of ribs further include a fifth rib that extends parallel to a predetermined application direction of a depressing force applied to the depressing portion, in one of the left side wall and the right side wall corresponding to an inner side of the second bent portion.

According to a fourth aspect of the present invention, in addition to the third aspect, the arm body further includes a thick-walled portion thickened as a whole thereof in the other one of the left side wall and the right side wall corresponding to an outer side of the second bent portion.

According to a fifth aspect of the present invention, in addition to the fourth aspect, the arm body further includes a lightened portion between the thick-walled portion and the depressing portion.

According to a sixth aspect of the present invention, in addition to one of the third to fifth aspects, the plurality of ribs further include three or less ribs extending radially toward a front side of the vehicle, starting from an innermost portion inside the first bent portion, in the one of the left side wall and the right side wall corresponding to the inner side of the second bent portion.

According to a seventh aspect of the present invention, in addition to one of the first to sixth aspects, the second hole is provided in a thin-walled portion in which a thickness between the left side wall and the right side wall in the arm body is thinned.

According to the configuration of the first aspect of the present invention, the plurality of ribs arranged in the arm body in a standing manner include, in at least one of the left side wall and the right side wall, the first rib and a second rib. Here, the first rib connects the first hole, into which the first shaft fixed to the vehicle body is inserted, and the peripheral edge on the side of the rear wall continuous of the at least one of the left side wall and the right side wall in the arm body continuous upward from the first bent portion that bends in a rear direction side of the vehicle as being a lower side of the vehicle, to extend on the first straight line connecting the depressing portion and the first hole as viewed in a side view of the vehicle. Also, the second rib connects the second hole, into which the second shaft connected to the vehicle control system is inserted, and the peripheral edge on the side of the rear wall continuous of the at least one of the left side wall and the right side wall continuous upward from the first bent portion, to extend on the second straight line connecting the depressing portion and the second hole as viewed in the side view. Accordingly, a vehicle pedal arm that can achieve weight saving, while effectively reducing stress generated due to a reaction force of a depressing force with the minimum required number of ribs can be realized.

According to the configuration of the second aspect of the present invention, the plurality of ribs further include the third rib that extends from the first hole so that the angle defined between the first rib and the third rib is within a range of an acute angle more than or equal to 45° and less than 90° or an angle of 90° toward the depressing portion, and the fourth rib that extends from the second hole so that the angle defined between the second rib and the fourth rib is within a range of an acute angle more than or equal to 45° and less than 90° or an angle of 90° toward the depressing portion. Accordingly, the first rib and the second rib can be reinforced to effectively reduce stress generated due to the reaction force of the depressing force, thereby enabling to further improve the strength and stiffness, while maintaining the weight saving.

According to the configuration of the third aspect of the present invention, the arm body further includes the second bent portion that bends to one of the left direction side and the right direction side of the vehicle as being a lower side of the vehicle, and the plurality of ribs further include the fifth rib that extends parallel to the predetermined application direction of the depressing force applied to the depressing portion, in one of the left side wall and the right side wall corresponding to an inner side of the second bent portion.

Accordingly, even if a bent portion is provided in the pedal arm in the width direction of the vehicle, a torsion force can be reliably received, thereby enabling to further improve the strength and stiffness, while maintaining required productivity.

According to the configuration of the fourth aspect of the present invention, the arm body further includes the thick-walled portion thickened as a whole thereof in the other one of the left side wall and the right side wall corresponding to an outer side of the second bent portion. Therefore, even if the bent portion is provided in the pedal arm in the width direction of the vehicle, the fifth rib is reinforced so as to be able to receive a torsion force reliably, thereby enabling to further improve the strength and stiffness, while maintaining required productivity.

According to the configuration of the fifth aspect of the present invention, the arm body further includes the lightened portion between the thick-walled portion and the depressing portion. Accordingly, even if the bent portion in the width direction of the vehicle, the fifth rib, and the thick-walled portion are provided in the pedal arm, stiffness balance on the right and left of the arm body can be achieved effectively.

According to the configuration of the sixth aspect of the present invention, the plurality of ribs further include three or less ribs extending radially toward the front side of the vehicle, starting from the innermost portion inside the first bent portion, in one of the left side wall and the right side wall corresponding to the inner side of the second bent portion. Accordingly, stress generated in the bent portion can be dispersed through the ribs, thereby enabling to relax concentration of stress in the bent portion.

According to the configuration of the seventh aspect of the present invention, the second hole is provided in the thin-walled portion in which a thickness between the left side wall and the right side wall in the arm body is thinned. Accordingly, downsizing and weight saving in the width direction of the pedal arm can be realized.

An eight aspect of the present invention is to provide a pedal arm to be mounted on a vehicle with a three-dimensional orthogonal coordinate system defined by a first axis, a second axis, and a third axis, comprising: an arm body having a first wall and a second wall, opposed to each other in a direction of the first axis, and a first side wall and a second side wall, opposed to each other in a direction of the second axis, with a plurality of ribs arranged in a standing manner to be an integrally molded article; a depressing portion provided at an end portion of the arm body in a negative direction of the third axis; a first hole penetrating the arm body in the direction of the second axis, into which a first shaft fixed to the vehicle is to be inserted; and a second hole penetrating the arm body in the direction of the second axis, into which a second shaft connected to a vehicle control system is to be inserted, wherein the arm body has a first bent portion that bends in a negative direction of the first axis as being extending in the negative direction of the third axis, wherein the second wall in the arm body continuous in the negative direction of the third axis from the first bent portion is arranged on a side of the negative direction of the third axis than a first straight line connecting a depressing point defined as predetermined one point of the depressing portion and a central axis of the first hole and a second straight line connecting the depressing point and a central axis of the second hole, wherein the plurality of ribs include, in at least one of the first side wall and the second side wall, a first rib that connects the first hole and a peripheral edge on a side of the second wall of the at least one of the first side wall and the second side wall in the arm body continuous in a positive direction of the third axis from the first bent portion and extends on the first straight line as viewed in a side view, and a second rib that differs from the first rib and connects the second hole and a peripheral edge on the side of the second wall of the at least one of the first side wall and the second side wall in the arm body continuous in the positive direction of the third axis from the first bent portion and extends on the second straight line as viewed in the side view, and wherein the second hole is provided in a thin-walled portion having a thin thickness, thinned in the direction of the second axis, in the arm body.

According to a ninth aspect of the present invention, in addition to the eighth aspect, the plurality of ribs further include a third rib that differs from the first rib and the second rib, and extends from the first hole so that an angle defined between the first rib and the third rib is within a range of an acute angle more than or equal to 45° and less than 90° or an angle of 90° toward the depressing portion, and a fourth rib that differs from the first rib, the second rib and the third rib, and extends from the second hole so that an angle defined between the second rib and the fourth rib is within a range of an acute angle more than or equal to 45° and less than 90° or an angle of 90° toward the depressing portion.

According to a tenth aspect of the present invention, in addition to the ninth aspect, the arm body further includes a second bent portion that bends to one of a positive direction and a negative direction of the second axis as being extending in the negative direction of the third axis, and the plurality of ribs further include a fifth rib that differs from the first rib, the second rib, the third rib and the fourth rib, and extends parallel to a predetermined application direction of a depressing force applied to the depressing portion, in one of the first side wall and the second side wall corresponding to an inner surface side of the second bent portion.

According to an eleventh aspect of the present invention, in addition to the tenth aspect, the arm body further includes a body base from which the first to fifth ribs project, and a thick-walled portion thickened as a whole, with respect to the body base, in the other one of the first side wall and the second side wall corresponding to an outer surface side of the second bent portion.

According to a twelfth aspect of the present invention, in addition to the eleventh aspect, the arm body further includes a lightened concave portion, not thickened with respect to the body base, between the thick-walled portion and the depressing portion.

According to a thirteenth aspect, in addition to the tenth aspect, the plurality of ribs further include another three or less radially extending ribs differing from the first rib, the second rib, the third rib, the fourth rib and the fifth rib, and extending radially in a positive direction of the first axis, starting from an innermost portion inside the first bent portion, in the one of the first side wall and the second side wall corresponding to the inner surface side of the second bent portion.

DETAILED DESCRIPTION OF THE PREFERRED EMBODIMENT

Figure 1:
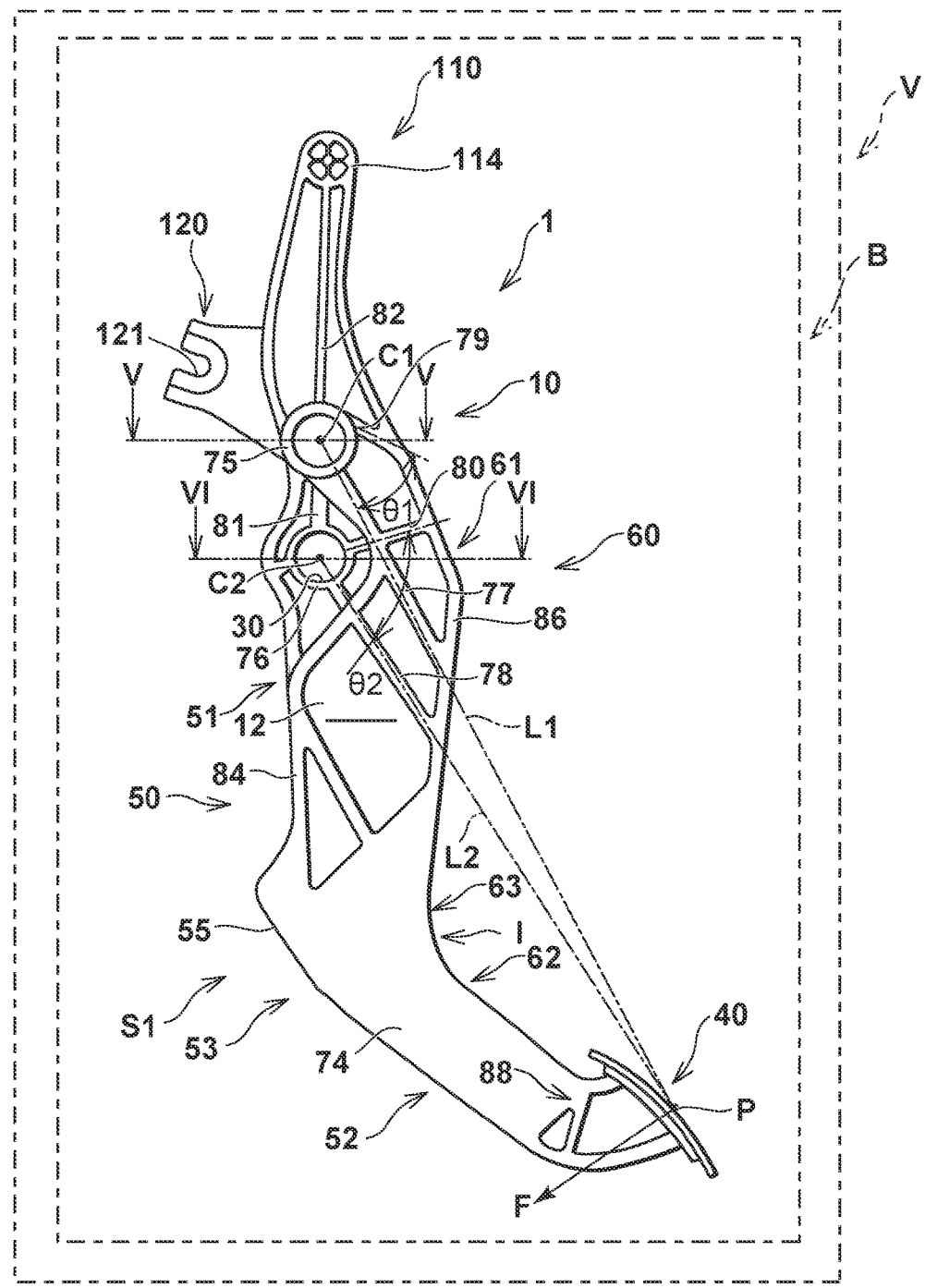
FIG. 1 is a left side view of a vehicle pedal arm according to an embodiment of the present invention.

A vehicle pedal arm according to an embodiment of the present invention will be described below in detail with reference to FIGS. 1 to 8 as appropriate. In the drawings, an x-axis (first axis), a y-axis (second axis), and a z-axis (third axis) form a three-dimensional orthogonal coordinate system. A positive direction of the x-axis is a rear direction of a vehicle body, a positive direction of the y-axis is a right direction of the vehicle body, and a positive direction of the z-axis is an upper direction of the vehicle body. The direction of the x-axis may be referred to as "longitudinal direction", the direction of the y-axis may be referred to as "width direction", and the direction of the z-axis may be referred to as "vertical direction".

FIGS. 1 to 4 sequentially correspond to a left side view, a front view, a right side view, and a back view of the vehicle pedal arm according to the present embodiment. FIGS. 5 to 8 sequentially correspond to a cross-sectional view along a line V-V in FIG. 1, a cross-sectional view along a line VI-VI in FIG. 1, a cross-sectional view along a line VII-VII in FIG. 3, and a cross-sectional view along a line VIII-VIII in FIG. 3. For convenience sake, ribs on a left side wall are omitted in FIG. 2, and ribs on a right side wall are omitted in FIG. 4.

As shown in FIGS. 1 to 8, a pedal arm 1 according to the present embodiment is applied to a pedal arm for a clutch pedal device of a vehicle V such as an automobile, and is obtained typically by integral molding using a synthetic resin material. In a state of being mounted on a pedal bracket (not shown) attached to a dashboard (not shown) of the vehicle body B, the pedal arm 1 can turn corresponding to a driver's depressing operation on a tread surface of the pedal arm 1 while receiving a depressing force F. The pedal arm 1 can be applied to an accelerator pedal device or a brake pedal device, and fiber-reinforced resin such as glass fiber or carbon fiber can be used as the synthetic resin material.

Specifically, the pedal arm 1 includes an arm body 10 provided with a pivot hole 20, into which a shaft 22 fixed to the pedal bracket of the vehicle body B is inserted, and a yoke hole 30, into which a yoke shaft 32 provided at a rear end of a push rod connected to a brake control system C of the vehicle V is inserted, below the pivot hole 20. The pivot hole 20 and the yoke hole 30 are through holes that linearly penetrate the arm body 10 along the width direction. The pedal arm 1 can turn around the shaft 22.

A depressing portion 40 with the tread surface being set on the surface thereof is provided at a lower end of the arm body 10, and a sensor attachment portion 110 is provided at an upper end of the arm body 10, in which an attachment shaft 112 attached with a sensor member (not shown) that detects a turning amount of the pedal arm 1 is provided in a standing manner in the right direction, in a mode of projecting upward from above the pivot hole 20. The tread surface of the depressing portion 40 has a polygonal shape or an elliptical shape as viewed from above along the application direction of the depressing force F. A pad member (not shown) made of an elastic member such as rubber can be attached to the depressing portion 40, and in this case, the tread surface is set on the surface of the pad member. In the arm body 10, a spring attachment portion 120 attached with a return spring (not shown) is provided in a mode of projecting forward between the pivot hole 20 and the sensor attachment portion 110. The depressing portion 40, the sensor attachment portion 110, and the spring attachment portion 120 are integrally molded with the arm body 10. When the sensor member does not need to be used, the sensor attachment portion 110 can be omitted. When an application position of the return spring is different, the spring attachment portion 120 having such a configuration can be omitted.

In the arm body 10 being an integrally molded article, a plurality of ribs, a thick-walled portion, and a thin-walled portion, which are respectively described later in detail, are added to a body base 12 having a curved shape in two directions, which includes a first bent portion S1 extending in a vertical direction with a portion lower than the pivot hole 20 and the yoke hole 30 being bent rearward as moving downward, and a second bent portion S2 bent rightward. These ribs, thick-walled portion, and thin-walled portion cooperate to form a front wall 50 and a rear wall 60 facing each other in the longitudinal direction, and a left side wall 70 and a right side wall 90 facing each other in the width direction. The front wall 50 and the rear wall 60 are connected to each other via the left side wall 70 and the right side wall 90. The body base 12 and the bent shape in the arm body 10 can be any of a curved shape or a crooked shape. The first bent portion S1 is essential because of a set position or the like of the depressing portion 40, and the second bent portion S2 can be omitted corresponding to a pedal layout or the like of the vehicle.

Figure 4:
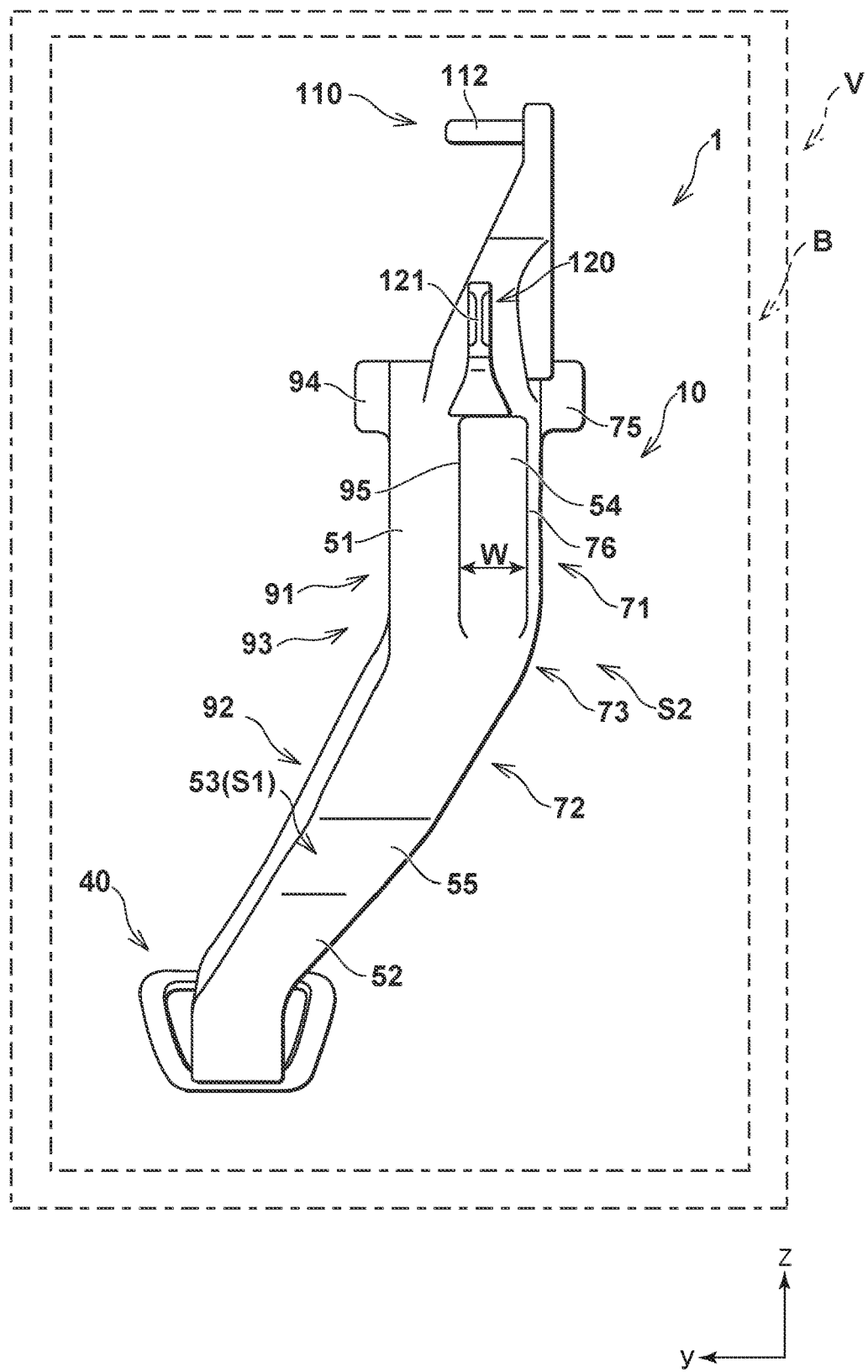
FIG. 4 is a back view of the vehicle pedal arm according to the present embodiment.
Figure 5:
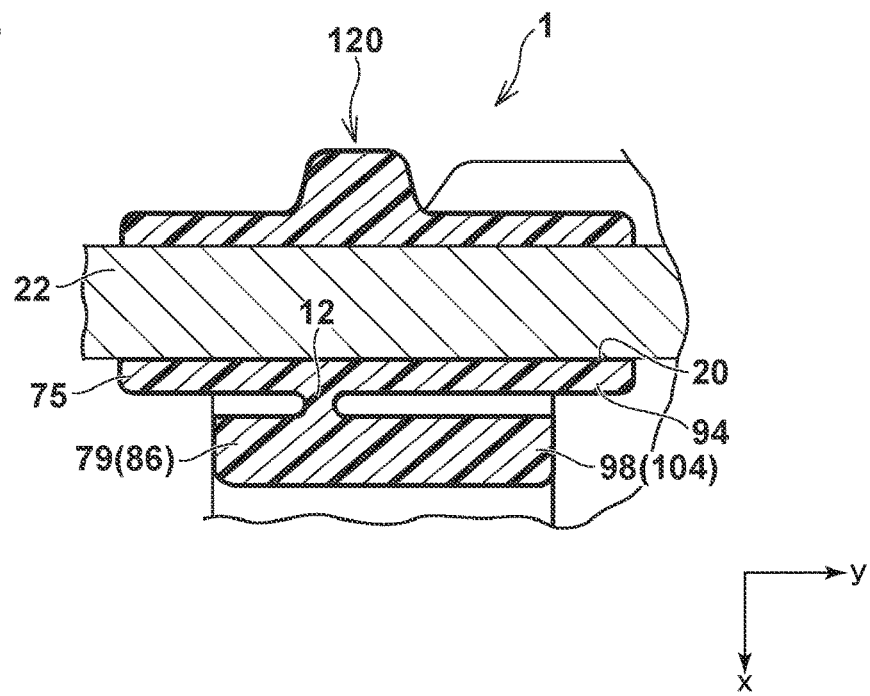
FIG. 5 is a cross-sectional view along a line V-V in FIG. 1.
Figure 6:
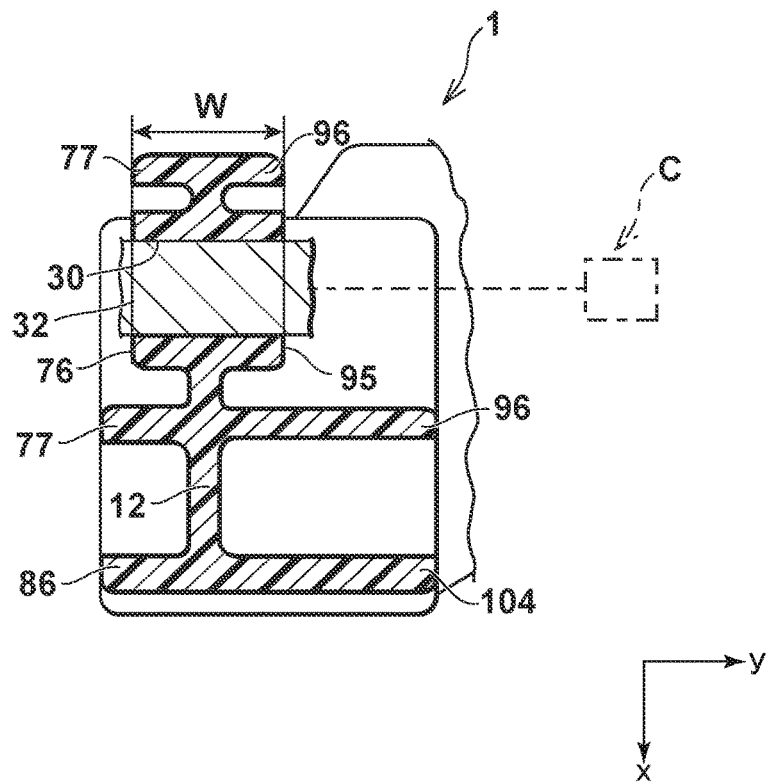
FIG. 6 is a cross-sectional view along a line VI-VI in FIG. 1.
Figure 7:
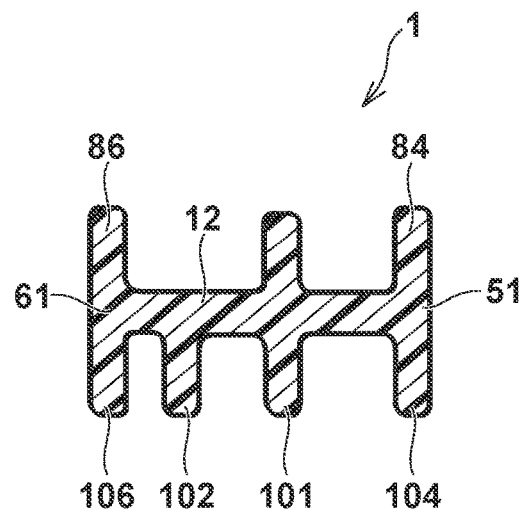
FIG. 7 is a cross-sectional view along a line VII-VII in FIG. 3.
Figure 8:
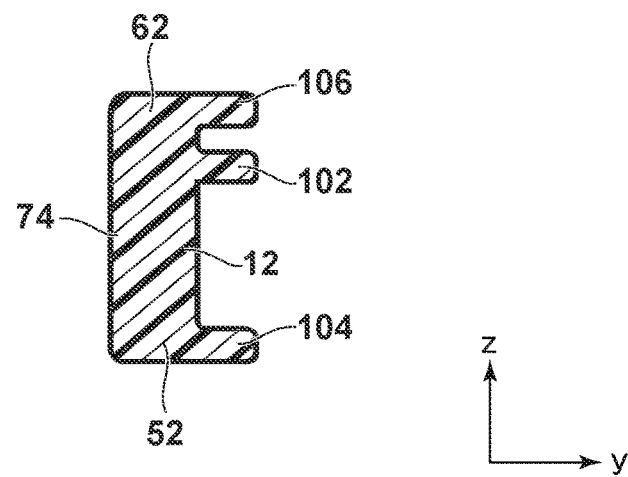
FIG. 8 is a cross-sectional view along a line VIII-VIII in FIG. 3.

As shown particularly in FIG. 4, the front wall 50 includes an upper front wall 51, a lower front wall 52, and a front bent portion 53 that connects the upper front wall 51 and the lower front wall 52 in the vertical direction therebetween and curves so as to project toward a lower forward direction. The spring attachment portion 120 having a long-hole notch portion 121 notched in an arc shape so that the return spring is attached to the front end thereof is provided by integral molding on the front side of the pivot hole 20 in the upper front wall 51, in a mode of projecting forward from the upper front wall 51. An upper part of the pivot hole 20 in the upper front wall 51 is smoothly continuous to the front wall of the sensor attachment portion 110. The front bent portion 53 is a front side of the first bent portion S1, and includes a stopper surface 55 that abuts on a part of the dashboard when a driver depresses down the depressing portion 40 to the maximum. It is desired from a viewpoint of receiving the depressing force F reliably that the stopper surface 55 is a planar part defined in a direction orthogonal to the application direction of the depressing force F. A lower rearward end of the lower front wall 52 is connected to the depressing portion 40 while curving upward. The lower rearward end of the lower front wall 52 can descend linearly to be connected to the depressing portion 40.

Figure 2:
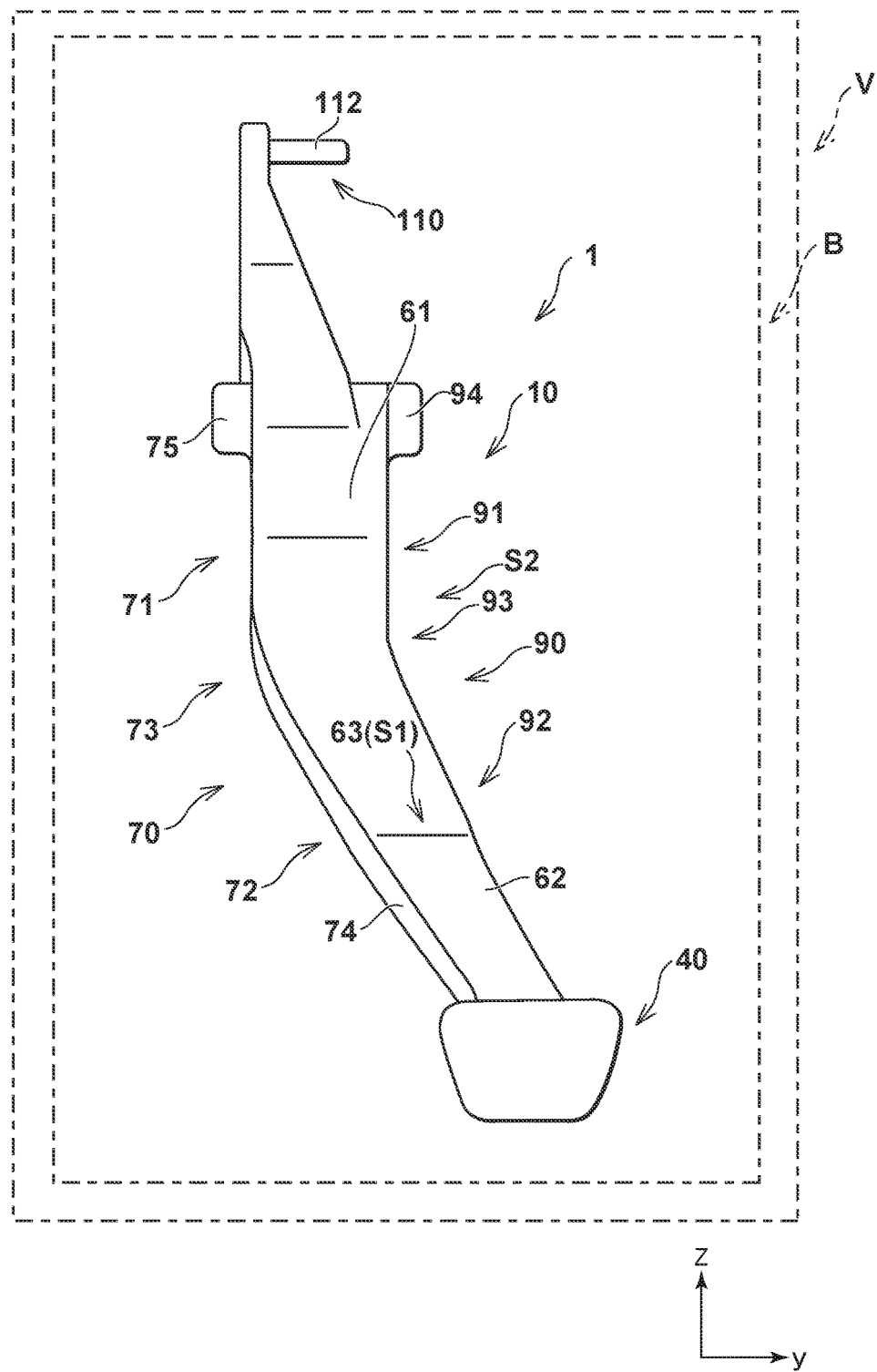
FIG. 2 is a front view of the vehicle pedal arm according to the present embodiment.
Figure 3:
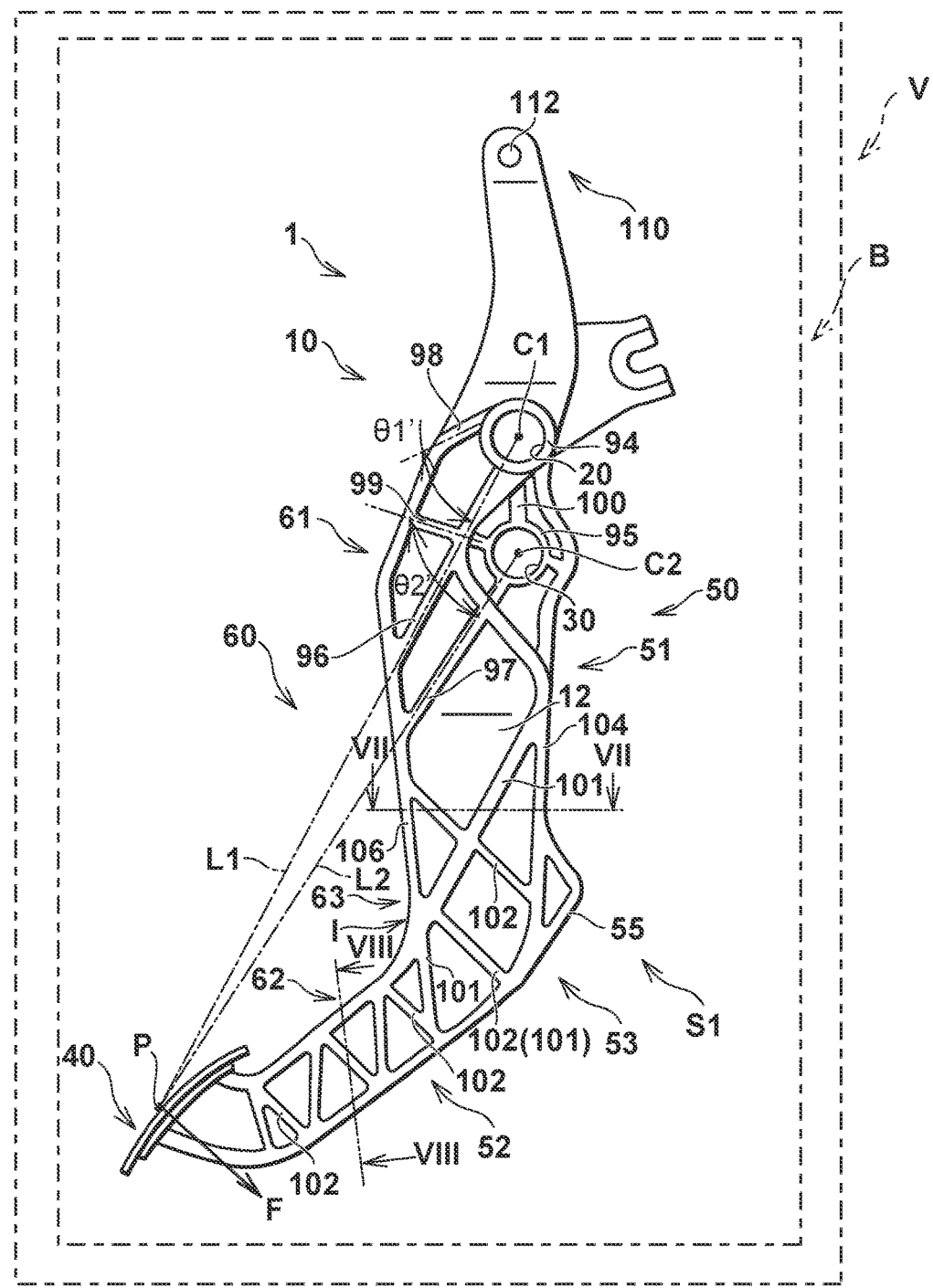
FIG. 3 is a right side view of the vehicle pedal arm according to the present embodiment.

As shown particularly in FIG. 2, the rear wall 60 includes an upper rear wall 61, a lower rear wall 62, and a rear bent portion 63 that connects the upper rear wall 61 and the lower rear wall 62 in the vertical direction therebetween and curves so as to project toward the lower forward direction. An upper part of the pivot hole 20 in the upper rear wall 61 is smoothly continuous to the rear wall of the sensor attachment portion 110. The rear bent portion 63 is a rear side of the first bent portion S1. A lower rearward end of the lower rear wall 62 is connected to the depressing portion 40 while curving upward.

As shown particularly in FIG. 1 and FIGS. 5 to 8, the left side wall 70 includes an upper left wall 71, a lower left wall 72, and a left bent portion 73 that connects the upper left wall 71 and the lower left wall 72 in the vertical direction therebetween and curves so as to project toward a lower left direction. A peripheral edge of the pivot hole 20 in the upper left wall 71 forms a protrusion 75 projecting leftward. The protrusion 75 increases the strength and stiffness of the peripheral edge of the pivot hole 20. An upper part of the pivot hole 20 in the upper left wall 71 is smoothly continuous to the left wall of the sensor attachment portion 110. A peripheral edge of the yoke hole 30 in the upper left wall 71 forms a stepped bottom 76 with the left surface of the body base 12 being depressed rightward. The left bent portion 73 is the left side of the second bent portion S2.

A lower rearward end of the lower left wall 72 is connected to the depressing portion 40. The lower rearward end of the lower left wall 72 can descend linearly to be connected to the depressing portion 40, according to a set position or the like of the depressing portion 40.

Specifically, the left side wall 70 is provided with a first rib 77 that extends rearward from the protrusion 75 at the peripheral edge of the pivot hole 20 to reach a peripheral edge on the rear direction side of the left side wall 70, while projecting leftward from the left surface of the body base 12 and extending on a straight line L1 connecting a depressing point P on the tread surface of the depressing portion 40 and a central axis C1 of the pivot hole 20 extending in the width direction, in the shortest distance as viewed in the side view. The left side wall 70 is also provided with a second rib 78 that extends rearward in a general portion other than a stepped portion from the stepped bottom 76 over the stepped portion at the peripheral edge of the yoke hole 30 to reach the peripheral edge on the rear direction side of the left side wall 70, while projecting leftward from the left surface of the body base 12 and extending on a straight line L2 connecting the depressing point P and a central axis C2 of the yoke hole 30 extending in the width direction in the shortest distance as viewed in the side view. The first rib 77 and the second rib 78 exert a function of decreasing the stress generated in the body base 12 due to a reaction force generated by the shafts 22 and 32 inserted correspondingly into the pivot hole 20 and the yoke hole 30, upon reception of the depressing force F applied to a depressing point P. Because there is the first bent portion S1, the lower rear wall 62 continuous to the rear bent portion 63 of the rear wall 60 and the depressing portion 40 therebetween is located below the straight lines L1 and L2. It suffices that a position of the depressing point P is set on the surface of the depressing portion 40, because the whole surface of the depressing portion 40 can be the tread surface. From the viewpoint of defining extending directions of the first rib 77 and the second rib 78 as viewed in the side view, the straight lines L1 and L2 can be set respectively as straight lines correspondingly connecting the depressing point P and a point on the central axis C1 of the pivot hole 20 and the depressing point P and a point on the central axis C2 of the yoke hole 30.

The left side wall 70 can be provided with a third rib 79 that extends rearward from the protrusion 75 at the peripheral edge of the pivot hole 20 to reach a peripheral edge on the rear direction side of the upper rear wall 61 of the rear wall 60, while projecting leftward from the left surface of the body base 12 so that an angle θ1 defined between the first rib 77 and the third rib 79 is within a range of an acute angle more than or equal to 45° and less than 90° or an angle of 90° toward the depressing portion 40. The left side wall 70 can be also provided with a fourth rib 80 that extends rearward in the general portion other than the stepped portion from the stepped bottom 76 over the stepped portion at the peripheral edge of the yoke hole 30 to reach the peripheral edge on the rear direction side of the upper rear wall 61 of the rear wall 60, while projecting leftward from the left surface of the body base 12 so that an angle θ2 defined between the second rib 78 and the fourth rib 80 is within a range of an acute angle more than or equal to 45° and less than 90° or an angle of 90° toward the depressing portion 40. The third rib 79 and the fourth rib 80 complement the first rib 77 and the second rib 78 to decrease the stress generated in the body base 12. The third rib 79 and the fourth rib 80 can be omitted, taking the convenience of production of a metal mold or the like into consideration.

The left side wall 70 can be also provided respectively with a rib 81 that extends to connect the protrusion 75 at the peripheral edge of the pivot hole 20 to the stepped bottom 76 at the peripheral edge of the yoke hole 30 via the stepped portion, while projecting leftward from the left surface of the body base 12, and a rib 82 that extends to connect the protrusion 75 at the peripheral edge of the pivot hole 20 to a reinforcing support portion 114 provided on the left surface of the body base 12 so as to face the attachment shaft 112 of the sensor attachment portion 110, while projecting leftward from the left surface of the body base 12. The ribs 81 and 82 complement the first rib 77 and the second rib 78 to decrease the stress generated in the body base 12. The ribs 81 and 82 can be omitted, taking the convenience of production of the metal mold or the like into consideration.

A front outer peripheral rib 84 and a rear outer peripheral rib 86 projecting leftward from the left surface of the body base 12 can be respectively provided at the peripheral edge of the upper left wall 71 of the left side wall 70. The front outer peripheral rib 84 is branched at the stepped portion to reach a front peripheral edge of the sensor attachment portion 110 from the upper left wall 71, while extending in a front peripheral edge of the stepped bottom 76 and a front peripheral edge of the general portion other than the stepped portion, and is continuous to respective left peripheral edges of a part of the upper front wall 51 and the front bent portion 53 in the front wall 50. The rear outer peripheral rib 86 reaches a rear peripheral edge of the sensor attachment portion 110 from the upper left wall 71, while extending in the front peripheral edge of the general portion, and is continuous to respective left peripheral edges of a part of the upper rear wall 61 and the rear bent portion 63 in the rear wall 60. The front outer peripheral rib 84 and the rear outer peripheral rib 86 are connected correspondingly to ribs 77 to 80, and the ribs 82 and 84. The front outer peripheral rib 84 and the rear outer peripheral rib 86 can be omitted, taking the convenience of production of the metal mold or the like into consideration.

A thick-walled portion 74 in which the thickness of the left surface of the body base 12 is increased by a weld overlay can be provided in the lower left wall 72 of the left side wall 70. Particularly, when the second bent portion S2 is applied, the thick-walled portion 74 contributes to ensure strength and stiffness of the arm body 10 to withstand a torsion force caused by the depressing force F. When the thick-walled portion 74 is provided in the lower left wall 72 of the left side wall 70, a lightened concave portion 88 without any weld overlay can be provided on the left surface of the body base 12 between the thick-walled portion 74 and the depressing portion 40 on the front side of the depressing portion 40 in the left side wall 70, in order to balance the stiffness on the right and left sides of the arm body 10. If required strength and the like can be ensured, an appropriate number of ribs projecting leftward from the left surface of the body base 12 can be provided instead of the thick-walled portion 74. Further, the thickness of the thick-walled portion 74 can be set evenly as a whole, or can be set differently according to a region so as to equalize the generated stress, taking the convenience of production of the metal mold or the like into consideration.

As shown in FIGS. 3 to 8, the right side wall 90 includes an upper right wall 91, a lower right wall 92, and a right bent portion 93 that connects the upper right wall 91 and the lower right wall 92 in the vertical direction therebetween and curves so as to project toward the lower left direction. The peripheral edge of the pivot hole 20 in the upper right wall 91 forms a protrusion 94 projecting rightward. The protrusion 94 increases the strength and stiffness of the peripheral edge of the pivot hole 20, and cooperates with the protrusion 75 projecting leftward at the peripheral edge of the pivot hole 20 in the upper left wall 71, to provide a fastening span long in the width direction to the shaft 22 inserted into the pivot hole 20. An upper part of the pivot hole 20 in the upper right wall 91 is smoothly continuous to the right wall of the sensor attachment portion 110. A peripheral edge of the yoke hole 30 in the upper right wall 91 forms a stepped bottom 95 with the right surface of the body base 12 being depressed leftward. The stepped bottom 95 cooperates with the stepped bottom 76 depressed rightward at the peripheral edge of the yoke hole 30 in the upper left wall 71, to form a thin-walled portion 54 having a thin thickness W in the width direction of the pedal arm 1. The thin-walled portion 54 contributes to weight saving of the pedal arm 1, in a compact mode in which the yoke does not protrude in the width direction unnecessarily from the pedal arm 1. The right bent portion 93 is the right side of the second bent portion S2. A lower rearward end of the lower right wall 92 is connected to the depressing portion 40. A rib that extends to connect the protrusion 94 at the peripheral edge of the pivot hole 20 to the base of the attachment shaft 112 of the sensor attachment portion 110 can be provided with respect to the right wall of the sensor attachment portion 110 according to need. The lower rearward end of the lower right wall 92 can descend linearly to be connected to the depressing portion 40, according to the set position or the like of the depressing portion 40, as in the lower left wall 72 of the left side wall 70.

Specifically, the right side wall 90 is provided with a first rib 96 that extends rearward from the protrusion 94 at the peripheral edge of the pivot hole 20 to reach a peripheral edge on the rear direction side of the right side wall 90, while projecting rightward from the right surface of the body base 12 and extending on the straight line L1 connecting the depressing point P on the tread surface of the depressing portion 40 and the central axis C1 of the pivot hole 20 extending in the width direction, in the shortest distance as viewed in the side view. The right side wall 90 is also provided with a second rib 97 that extends rearward in a general portion other than a stepped portion from the stepped bottom 95 over the stepped portion at the peripheral edge of the yoke hole 30 to reach the peripheral edge on the rear direction side of the right side wall 90, while projecting rightward from the right surface of the body base 12 and extending on the straight line L2 connecting the depressing point P and the central axis C2 of the yoke hole 30 extending in the width direction in the shortest distance as viewed in the side view. The first rib 96 and the second rib 97 exert a function of decreasing the stress generated in the body base 12 due to the reaction force generated by the shafts 22 and 32 inserted correspondingly into the pivot hole 20 and the yoke hole 30, upon reception of the depressing force F applied to the depressing point P. Because there is the first bent portion S1 as in the left side wall 70, the lower rear wall 62 continuous to the rear bent portion 63 of the rear wall 60 and the depressing portion 40 therebetween is located below the straight lines L1 and L2.

It suffices that the position of the depressing point P is set on the surface of the depressing portion 40 because the whole surface of the depressing portion 40 can be the tread surface. From the viewpoint of defining extending directions of the first rib 96 and the second rib 97 as viewed in the side view, the straight lines L1 and L2 can be set respectively as straight lines correspondingly connecting the depressing point P and a point on the central axis C1 of the pivot hole 20 and the depressing point P and a point on the central axis C2 of the yoke hole 30.

The right side wall 90 can be provided with a third rib 98 that extends rearward from the protrusion 94 at the peripheral edge of the pivot hole 20 to reach the peripheral edge on the rear direction side of the right side wall 90, while projecting rightward from the right surface of the body base 12 so that an angle θ1' defined between the first rib 96 and the third rib 98 is within a range of an acute angle more than or equal to 45° and less than 90° or an angle of 90° toward the depressing portion 40. The right side wall 90 can be also provided with a fourth rib 99 that extends rearward in the general portion other than the stepped portion from the stepped bottom 95 over the stepped portion at the peripheral edge of the yoke hole 30 to reach the peripheral edge on the rear direction side of the right side wall 90, while projecting rightward from the right surface of the body base 12 so that an angle θ2' defined between the second rib 97 and the fourth rib 99 is within a range of an acute angle more than or equal to 45° and less than 90° or an angle of 90° toward the depressing portion 40. The third rib 98 and the fourth rib 99 complement the first rib 96 and the second rib 97 to decrease the stress generated in the body base 12. The third rib 98 and the fourth rib 99 can be omitted, taking the convenience of production of the metal mold or the like into consideration.

The right side wall 90 can be also provided with a rib 100 that extends to connect the protrusion 94 at the peripheral edge of the pivot hole 20 to the stepped bottom 95 at the peripheral edge of the yoke hole 30 via the stepped portion, while projecting rightward from the right surface of the body base 12. The rib 100 complements the first rib 96 and the second rib 97 to decrease the stress generated in the body base 12. The rib 100 can be omitted, taking the convenience of production of the metal mold or the like into consideration.

The right side wall 90 can be also provided with a rib 101 that extends radially from a region corresponding to an innermost portion I of the rear bent portion 63 of the rear wall 60 toward the front wall 50, while projecting rightward from the right surface of the body base 12, The rib 101 decreases the stress generated in the innermost portion of the rear bent portion 63. Even if four or more ribs 101 are provided, contribution to the strength and stiffness is small. It is preferable that the number of ribs 101 is three or less, taking the convenience of production of the metal mold or the like into consideration. Further, the rib 101 can be omitted, taking the convenience of production of the metal mold or the like into consideration.

Further, the lower right wall 92 of the right side wall 90 can be provided with a rib 102 that extends to connect the peripheral edge on a forward direction side to the peripheral edge on the rear direction side of the right side wall 90 parallel to the application direction of the depressing force F, while projecting rightward from the right surface of the body base 12. Particularly, when the second bent portion S2 is applied, the rib 102 contributes to ensure the strength and stiffness of the arm body 10 to withstand the torsion force caused by the depressing force F. The application direction of the depressing force F is a predetermined direction passing a predetermined depressing point P set on the tread surface being on the surface side of the depressing portion 40 at the time of designing of the pedal arm 1 and orthogonal to the tread surface. For example, if the tread surface is a curved surface, the application direction of the depressing force F is a predetermined direction orthogonal to a tangent line passing the depressing point P on the tread surface. Typically, a plurality of ribs 102 are arranged in parallel at a regular interval, and the stopper surface 55 in the front bent portion 53 of the front wall 50 is a planar part defined in a direction orthogonal to the extending direction of the ribs 102. The ribs 102 can be omitted, taking the convenience of production of the metal mold or the like into consideration.

A front outer peripheral rib 104 and a rear outer peripheral rib 106 projecting rightward from the right surface of the body base 12 can be respectively provided at the peripheral edges of the upper right wall 91, the lower right wall 92, and the right bent portion 93 in the right side wall 90. The front outer peripheral rib 104 is branched at the stepped portion to connect the protrusion 94 at the peripheral edge of the pivot hole 20 to the depressing portion 40, while extending in the front peripheral edge of the stepped bottom 95 and the front peripheral edge of the general portion other than the stepped portion, and is continuous to respective right peripheral edges of the upper front wall 51, the lower front wall 52, and the front bent portion 53 of the front wall 50. The rear outer peripheral rib 106 connects the third rib 98 and the depressing portion 40, while extending in the front peripheral edge of the general portion, and is continuous to respective right peripheral edges of the upper rear wall 61, the lower rear wall 62, and the rear bent portion 63 in the rear wall 60. The front outer peripheral rib 104 and the rear outer peripheral rib 106 are connected correspondingly to the ribs 96 to 99, and ribs 101 and 102. The front outer peripheral rib 104 and the rear outer peripheral rib 106 can be omitted, taking the convenience of production of the metal mold or the like into consideration.

In the embodiment described above, the thickness in the width direction of the body base 12 with which the ribs 77 to 86 and the ribs 96 to 106 are provided in a standing manner can be set to a constant value equal to each other, or can be set to a different value according to a region so that the generated stress is equalized.

Further, widths of the ribs 77 to 86 and the ribs 96 to 106 and heights thereof from the body base 12 can be set to a constant value equal to each other taking the convenience of production of the metal mold or the like into consideration, or can be set to a different value according to a region so that the generated stress is equalized.

The first ribs 77 and 96 and the second ribs 78 and 97 can be provided on only one side of the left side wall 70 and the right side wall 90, in view of the magnitude of the generated stress.

In the present invention, the type, the form, the arrangement, the number, and the like of the constituent members are not limited to those in the embodiment explained above, and it is needless to mention that the constituent elements can be modified as appropriate without departing from the scope of the invention, such as appropriately replacing these elements by other ones having identical operational effects.

As described above, the present invention can provide a vehicle pedal arm that is suitable for integral molding by using a resin material, and can realize weight saving while maintaining required productivity, strength, and the like with a simple configuration. Therefore, because of its general purposes and universal characteristics, applications of the present invention can be expected in a wide range in the field of a pedal arm of a movable body such as a vehicle.

Reference is hereby made to a Patent Application No. TOKUGAN 2014-161603 with a filing date of Aug. 7, 2014 in Japan, the entire content of which is incorporated herein by reference.

What is claimed is:

1. A pedal arm to be mounted on a vehicle with a three-dimensional orthogonal coordinate system defined by a first axis, a second axis, and a third axis, comprising:
   an arm body having a first wall and a second wall, opposed to each other in a direction of the first axis, and a first side wall and a second side wall, opposed to each other in a direction of the second axis, with a plurality of ribs arranged in a standing manner to be an integrally molded article;
   a depressing portion provided at an end portion of the arm body in a negative direction of the third axis;

a first hole penetrating the arm body in the direction of the second axis, into which a first shaft fixed to the vehicle is to be inserted; and a second hole penetrating the arm body in the direction of the second axis, into which a second shaft connected to a vehicle control system is to be inserted, wherein the arm body has a first bent portion that bends in a negative direction of the first axis as being extending in the negative direction of the third axis, wherein the second wall in the arm body continuous in the negative direction of the third axis from the first bent portion is arranged on a side of the negative direction of the third axis than a first straight line connecting a predetermined depressing point of the depressing portion and a central axis of the first hole and a second straight line connecting the depressing point and a central axis of the second hole, wherein the plurality of ribs include, in at least one of the first side wall and the second side wall, a first rib that connects the first hole and a peripheral edge on a side of the second wall of the at least one of the first side wall and the second side wall in the arm body continuous in a positive direction of the third axis from the first bent portion and extends on the first straight line as viewed in a side view, and a second rib that differs from the first rib and connects the second hole and a peripheral edge on the side of the second wall of the at least one of the first side wall and the second side wall in the arm body continuous in the positive direction of the third axis from the first bent portion and extends on the second straight line as viewed in the side view, and wherein the second hole is provided in a thin-walled portion having a thin thickness, thinned in the direction of the second axis, in the arm body.

2. The pedal arm according to claim 1, wherein the plurality of ribs further include a third rib that differs from the first rib and the second rib, and extends from the first hole so that an angle defined between the first rib and the third rib is within a range of an acute angle more than or equal to 45° and less than 90° or an angle of 90° toward the depressing portion, and a fourth rib that differs from the first rib, the second rib and the third rib, and extends from the second hole so that an angle defined between the second rib and the fourth rib is within a range of an acute angle more than or equal to 45° and less than 90° or an angle of 90° toward the depressing portion.

3. The pedal arm according to claim 2, wherein the arm body further includes a second bent portion that bends to one of a positive direction and a negative direction of the second axis as being extending in the negative direction of the third axis, and the plurality of ribs further include a fifth rib that differs from the first rib, the second rib, the third rib and the fourth rib, and extends parallel to a predetermined application direction of a depressing force applied to the depressing portion, in one of the first side wall and the second side wall corresponding to an inner surface side of the second bent portion.

4. The pedal arm according to claim 3, wherein the arm body further includes a body base from which the first to fifth ribs project, and a thick-walled portion thickened as a whole, with respect to the body base, in the other one of the first side wall and the second side wall corresponding to an outer surface side of the second bent portion.

5. The pedal arm according to claim 4, wherein the arm body further includes a lightened concave portion, not thickened with respect to the body base, between the thick-walled portion and the depressing portion.

6. The pedal arm according to claim 3, wherein the plurality of ribs further include another three or less radially extending ribs differing from the first rib, the second rib, the third rib, the fourth rib and the fifth rib, and extending radially in a positive direction of the first axis, starting from an innermost portion inside the first bent portion, in the one of the first side wall and the second side wall corresponding to the inner surface side of the second bent portion.

* * * * *